(12) United States Patent
Shinn

(10) Patent No.: US 11,381,374 B2
(45) Date of Patent: Jul. 5, 2022

(54) COMMUNICATION BETWEEN HALF DUPLEX AND FULL DUPLEX SYSTEMS

(71) Applicant: TAIT INTERNATIONAL LIMITED, Christchurch (NZ)

(72) Inventor: Tong-Wook Shinn, Christchurch (NZ)

(73) Assignee: TAIT INTERNATIONAL LIMITED, Christchurch (NZ)

( * ) Notice: Subject to any disclaimer, the term of this patent is extended or adjusted under 35 U.S.C. 154(b) by 132 days.

(21) Appl. No.: 16/568,383

(22) Filed: Sep. 12, 2019

(65) Prior Publication Data

US 2020/0084014 A1 Mar. 12, 2020

Related U.S. Application Data

(60) Provisional application No. 62/730,107, filed on Sep. 12, 2018.

(51) Int. Cl.
*H04L 5/16* (2006.01)
*H04W 4/10* (2009.01)
*H04M 7/00* (2006.01)

(52) U.S. Cl.
CPC ............ *H04L 5/16* (2013.01); *H04M 7/006* (2013.01); *H04W 4/10* (2013.01)

(58) Field of Classification Search
None
See application file for complete search history.

(56) References Cited

U.S. PATENT DOCUMENTS

| | | | |
|---|---|---|---|
| 7,313,103 B2 | 12/2007 | Cox et al. | |
| 8,346,211 B2 | 1/2013 | Shuman et al. | |
| 8,442,506 B2 | 5/2013 | Peacock | |
| 8,666,406 B2 | 3/2014 | Dhodapkar | |
| 9,520,892 B2 | 12/2016 | Razdan et al. | |
| 9,578,546 B2 | 2/2017 | Paladugu et al. | |
| 2004/0224678 A1 | 11/2004 | Dahod et al. | |

(Continued)

FOREIGN PATENT DOCUMENTS

| | | |
|---|---|---|
| EP | 1949588 A2 | 7/2008 |
| KR | 101723555 B1 | 4/2017 |
| WO | 2016065036 A1 | 4/2016 |

OTHER PUBLICATIONS https://portal.3gpp.org/desktopmodules/Specifications/SpecificationDetails.aspx?specificationId=3242.

*Primary Examiner* — Rebecca E Song
(74) *Attorney, Agent, or Firm* — Ladas & Parry LLP; Malcolm J. MacDonald

(57) ABSTRACT

A method in which a media server detects a media stream from a gateway which is only capable of sending a stream from a half duplex source. Call setup, such as a floor request from the gateway or the half duplex source, is not required. The media server then blocks media streams from full duplex sources to create half duplex communication, without using a buffer. Once the stream from the gateway has ended, the server detects streams from other sources and restores full duplex communication. A communication server carries out the method and is capable of detecting whether or not the server is connected to a half duplex source, such as a Land Mobile Radio (LMR) gateway, and then altering behavior according to that source. In doing so, the server enables either half duplex or full duplex operation, depending upon whether the source data originates from the half duplex source.

12 Claims, 13 Drawing Sheets

(56) References Cited

U.S. PATENT DOCUMENTS

| | | | |
|---|---|---|---|
| 2005/0124365 A1 | 6/2005 | Balasuriya et al. | |
| 2007/0105579 A1* | 5/2007 | Shaffer | H04L 65/605 |
| | | | 455/519 |
| 2007/0117581 A1 | 5/2007 | Chu et al. | |
| 2007/0202910 A1 | 8/2007 | Brewer et al. | |
| 2009/0296904 A1 | 12/2009 | Brewer et al. | |
| 2011/0085475 A1* | 4/2011 | Sinivaara | H04W 8/26 |
| | | | 370/312 |
| 2013/0229952 A1* | 9/2013 | Koskinen | H04W 72/1215 |
| | | | 370/278 |
| 2014/0122600 A1* | 5/2014 | Kim | H04L 65/403 |
| | | | 709/204 |
| 2017/0054777 A1* | 2/2017 | Leung | H04M 7/0072 |

\* cited by examiner

COMMUNICATION BETWEEN HALF DUPLEX AND FULL DUPLEX SYSTEMS

FIELD OF THE INVENTION

This invention relates to Push To Talk (PTT) operation in a combined LMR and cellular communication system. More particularly this invention relates to an apparatus integrating an LMR system to a cellular system such that half duplex operation can continue as normal on the LMR side while operation on the cellular side switches between full duplex and half duplex depending upon the source of the transmission.

BACKGROUND TO THE INVENTION

Land Mobile Radio (LMR) systems traditionally support PTT operation in half duplex. This means that a user device can either transmit or receive but not do so simultaneously. PTT solutions that operate over Internet Protocol (IP) however are able to operate transmit and receive simultaneously. These are also referred to as Voice Over IP (VOIP) solutions. Some VOIP solutions are implemented as half duplex which means it is relatively easy to integrate with LMR. When a VOIP solution is implemented as full duplex however it is more difficult to integrate with LMR. Full duplex solutions mean the device can transmit and receive simultaneously.

Push To Talk over Cellular (PTToC) solutions are used by professional users such as security guards for voice communication. The technology typically uses a PTToC server deployed either locally or on the cloud and multiple PTToC clients connect to the server for operations. Typically the clients operate on smart phones using the cellular network for communications and the voice service supplied is either half duplex or full duplex. More generally the technology is referred to as VOIP because the voice service can run over any suitable IP network such as wifi as well as cellular.

LMR is a technology that supplies PTT voice service but operates over communication technology specifically optimized for voice. Examples of LMR technology include but are not limited to P25 (APCO 25), Tetra, DMR (Digital Mobile Radio), or analogue LMR. LMR PTT voice service typically operates using an LMR server that forms a central controller to which all the LMR radios connect to for service. Generally LMR voice services are half duplex.

Professional users such as police, fire and ambulance tend to use a combination of LMR and PTToC technologies. Whereas most LMR voice services are half duplex, the PTToC services may be either half duplex or full duplex. In cases where the PTToC service needs to be full duplex and the LMR service is half duplex there exists a technology challenge to integrate the systems through a communication server.

SUMMARY OF THE INVENTION

It is an object of the invention to assist change over between full duplex and half duplex operation of VOIP services whilst integrated with a half duplex LMR system.

In one aspect the invention resides in a method of detecting that voice is originating form a half duplex LMR voice system and automatically altering the operation of the media server to cater for half duplex. Upon detecting that a voice channel is originating from the LMR system the server automatically forces all clients to operate in a half duplex mode.

In another aspect the invention resides in a method of detecting that voice is not originating from a half duplex LMR voice system and automatically altering the operation of the media server to be full duplex. Upon detecting that a voice channel is not originating from the LMR system the server automatically enables all clients to operate in a full duplex mode.

The system from which LMR is originating can be any type of LMR including but not limited to P25 (APCO 25), Tetra, DMR (Digital Mobile Radio), or analogue LMR. The description of the LMR network described her is a trunked P25 network however the approach of switching between full duplex and half duplex in the PTT core is valid irrespective of the type of LMR network being connected, either trunked or conventional.

BRIEF DESCRIPTION OF THE DRAWINGS

Preferred embodiments of the invention will be described with respect to the accompanying drawings, of which.

DETAILED DESCRIPTION OF THE INVENTION

Figure 1:
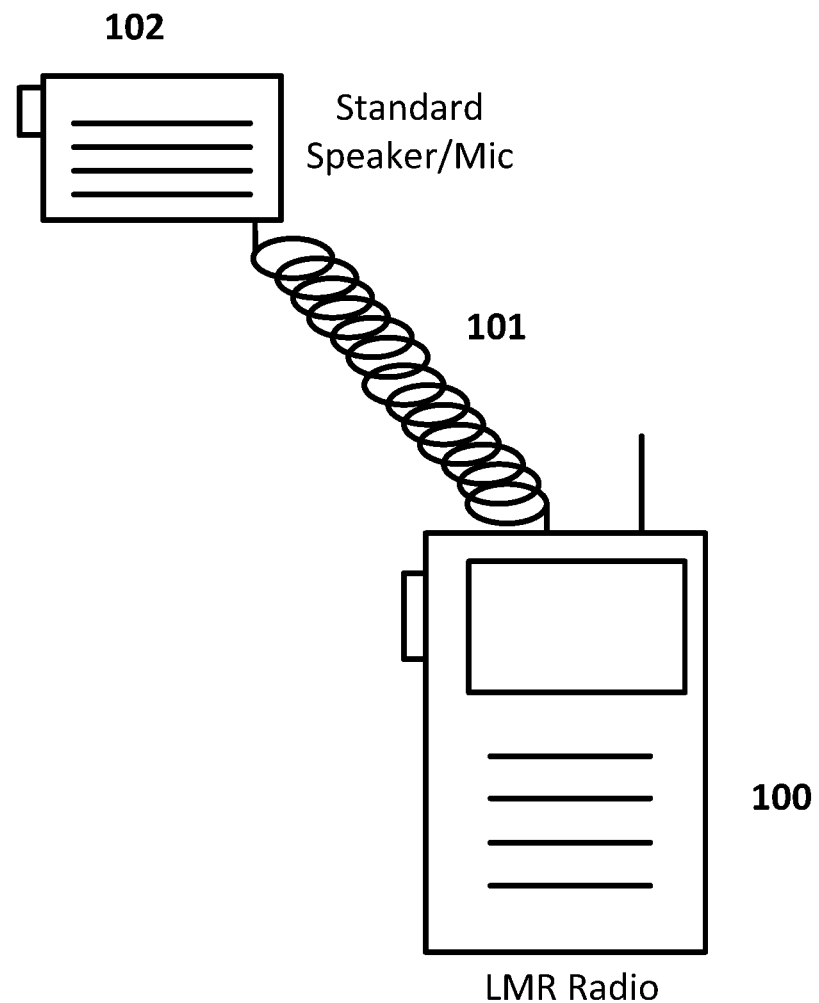
FIG. 1 shows a typical LMR radio attached to a standard speaker/mic.

Referring to the drawings it will be appreciated the invention may be performed in a variety of ways using many forms of LMR as a source of half duplex voice and many forms of VOIP technology. Alternatively the same approach works when the source of audio is from any half duplex source including existing PTToC solutions that operate in half duplex.

FIG. 1 shows a typical configuration of an LMR radio 100 connected to a standard speaker mic 102 through a cable 101. This is a common configuration used in the field today. For example a police officer may be wearing an LMR radio 100 on a belt and a cable 101 may run up the body to a speaker mic located on a lapel or another convenient position. The cable 101 typically carries audio signals and push to talk (PTT) signals. This type of speaker mic 102 typically has minimal processing capability and represents an extension of the functionality of the attached LMR radio.

Figure 2:
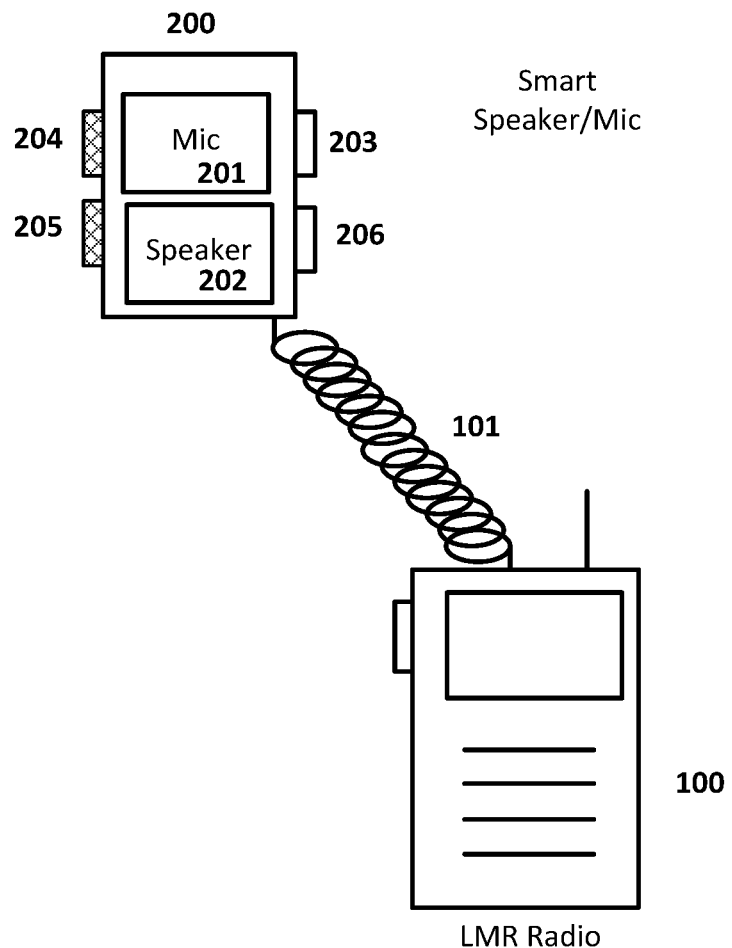
FIG. 2 shows a typical LMR radio connected to a smart mic.

FIG. 2 shows a smart speaker mic 200. The smart mic contains its own processor. The smart mic is optionally connected to an LMR radio 100 via a cable 101 that may be the same as that described in FIG. 1. The smart mic 200 also contains one or more microphones 201 and one or more speakers 202 and one or more function buttons. In this case two PTT buttons are shown 204 and 205 and two other buttons 203 and 206 represent general function buttons such as report location or emergency button. All the buttons are configurable.

Figure 3:
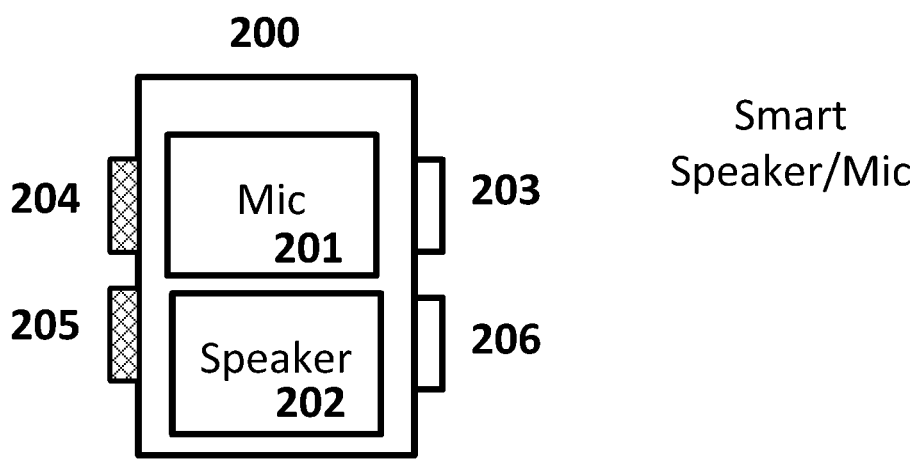
FIG. 3 shows a typical smart mic operating independently of the LMR radio.

FIG. 3 shows a smart speaker mic 200 in isolation to illustrate that the smart mic can operate independently of the radio. Loaded on the smart mic is a VOIP application client. The application is configured such that one or more voice groups may exist e.g. one for local operations and one for dispatcher operations. Alternatively the application client can support individual calls such that one smart mic user can contact one other smart mic user. This application client normally operates in full duplex voice mode meaning the users of this device and of other smart mic devices can talk and listen at the same time.

Figure 4:
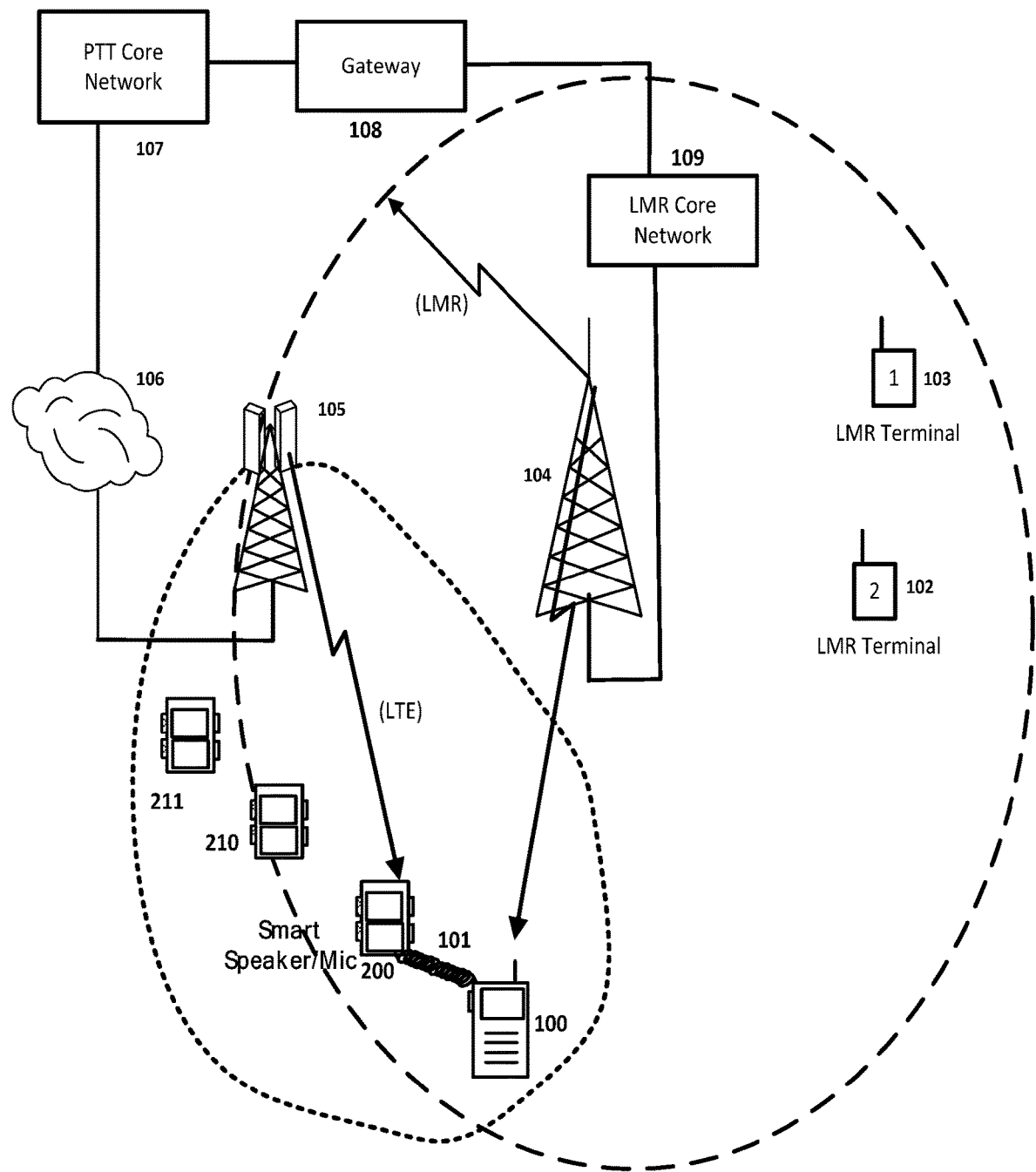
FIG. 4 shows a system overview of an LMR system operating with a cellular system.

FIG. 4 shows an overview of the system described here in. An LMR core network 109 is connected to one or more LMR communication towers 104 that radiate an LMR signal across the geographic area shown which serves several devices including 102 and 103. FIG. 4 also shows a PTT Core network 107, typically a communication server, which offers full duplex voice services though is also capable of automatically switching to half duplex. This connects to one or more cellular towers through an IP network 106. In this illustration it is assumed the cellular towers are LTE although any cellular technology capable of supporting IP connectivity is sufficient. The LTE towers supply service within the geographic area shown and serve several smart mic devices including 210 and 211.

The figure also shows a voice gateway 108 between the PTT Core 107 and the LMR Core 109, both being communication servers. Also shown is a smart mic 200 connected by a cable 101 to an LMR radio 100. This particular smart mic unit 200 is capable of making calls over either LTE or Radio. LMR terminals 102 and 103 and 100 can communicate with each other using the LMR network. Smart mic units 200, 210 and 211 can communicate with each other using the LTE network. In the presence of the gateway 108 then all the devices 100, 102, 103, 200, 210 and 211 can communicate with each other. In the special case of smart mic 200, the smart mic can initiate a call on either the LTE network using one button or can initiate a call on the LMR network using another button. Alternatively the smart mic can receive on either LTE or LMR (via the LMR radio).

Figure 5:
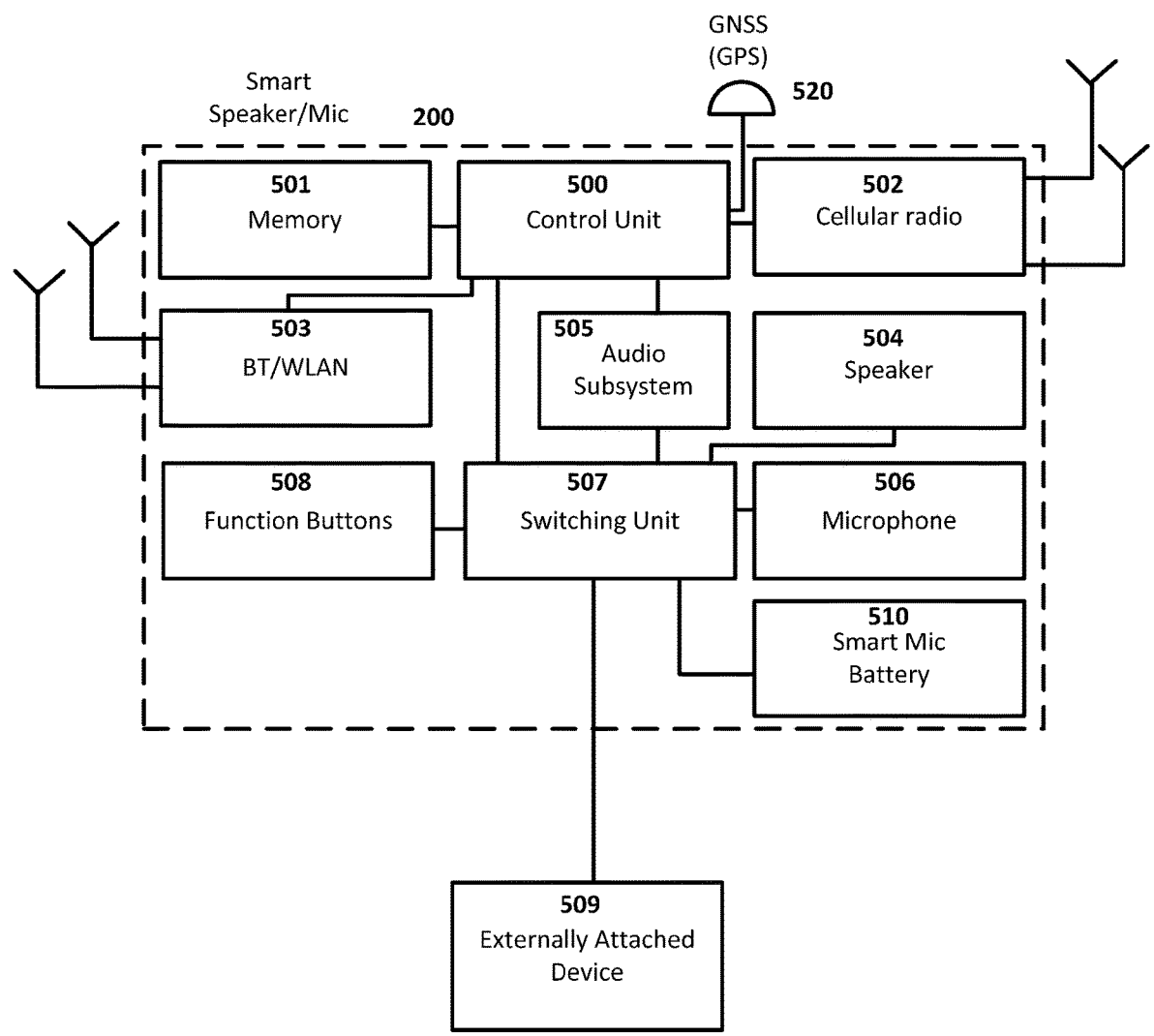
FIG. 5 shows and overview of the smart mic, FIG. 6 describes a typical LMR system.

FIG. 5 offers a system description of a smart mic 200 of the form described herein. The smart mic contains a control unit 500 which is a processor and that implements control and communication functions. The control unit connects to a GPS unit 520 for the purpose of reading smart mic location. For convenience in this document the US technology is described which is GPS however all forms of Global Navigation Satellite System (GNSS) are included. The computer programs that implement the algorithms on the platform are contained within local memory 501 and executed on the smart mic. The smart mic optionally contains a cellular radio 502 used for communicating over the cellular network. The cellular radio 502 is connected to the control unit 500. The smart mic contains a Bluetooth and or WLAN unit 503 used for communicating to local equipment over this medium. The Bluetooth and or WLAN 503 are connected to the control unit 500.

The smart mic also contains one or more microphones 506 and one or more speakers 504 and one or more function buttons 508. These are preferentially connected to the control unit 500 via a switching control unit 507 and/or the audio subsystem 505. Audio subsystem processing may include adjusting audio levels, injecting audio and audio filtering. The smart mic also contains a local power source 510 that in this case is a battery. Also connected to the switching unit is an externally attached device 509 that in this case is an LMR radio. This LMR radio may be a handheld that operates from a battery. Alternatively the LMR radio may be installed in a vehicle. In the LMR industry this is typically referred to as a mobile radio that operates from a vehicle power supply.

Figure 6:
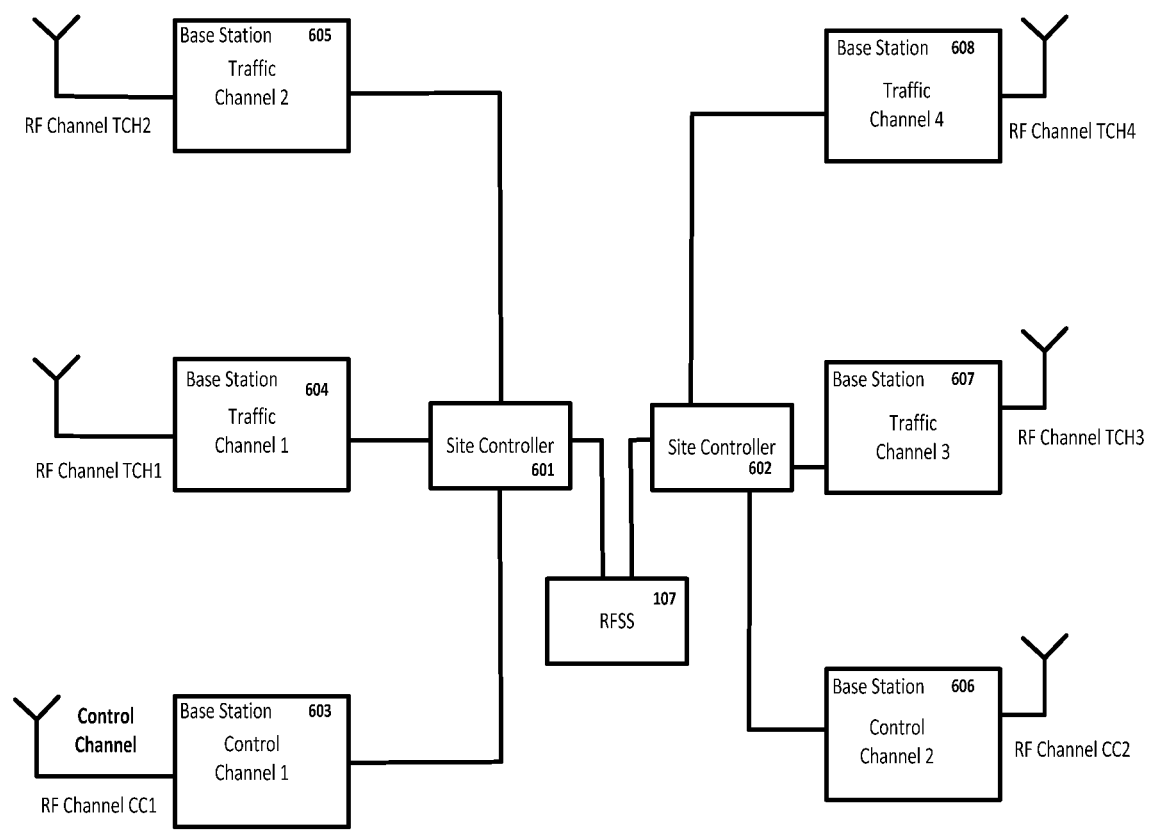

FIG. 6 offers an overview of the components in a typical trunked LMR system. Base station 603 represents a control channel, labelled RF Channel CC1 in a trunked system. Base stations 604 and 605 represent traffic channels, TCH1 and TCH2 that can be allocated using CC1 offered on base station 603. Typically a physical site is managed by a site controller 601. A second site is also shown controlled by site controller 602 which in turn controls control channel 606 and traffic channels 607 and 608. Each site controller is connected to a LMR trunked controller referred to in P25 as a Radio Frequency Sub System Controller (RFSS Controller). The P25 RFSS Controller 107 is the central point of control in the network.

Figure 7:
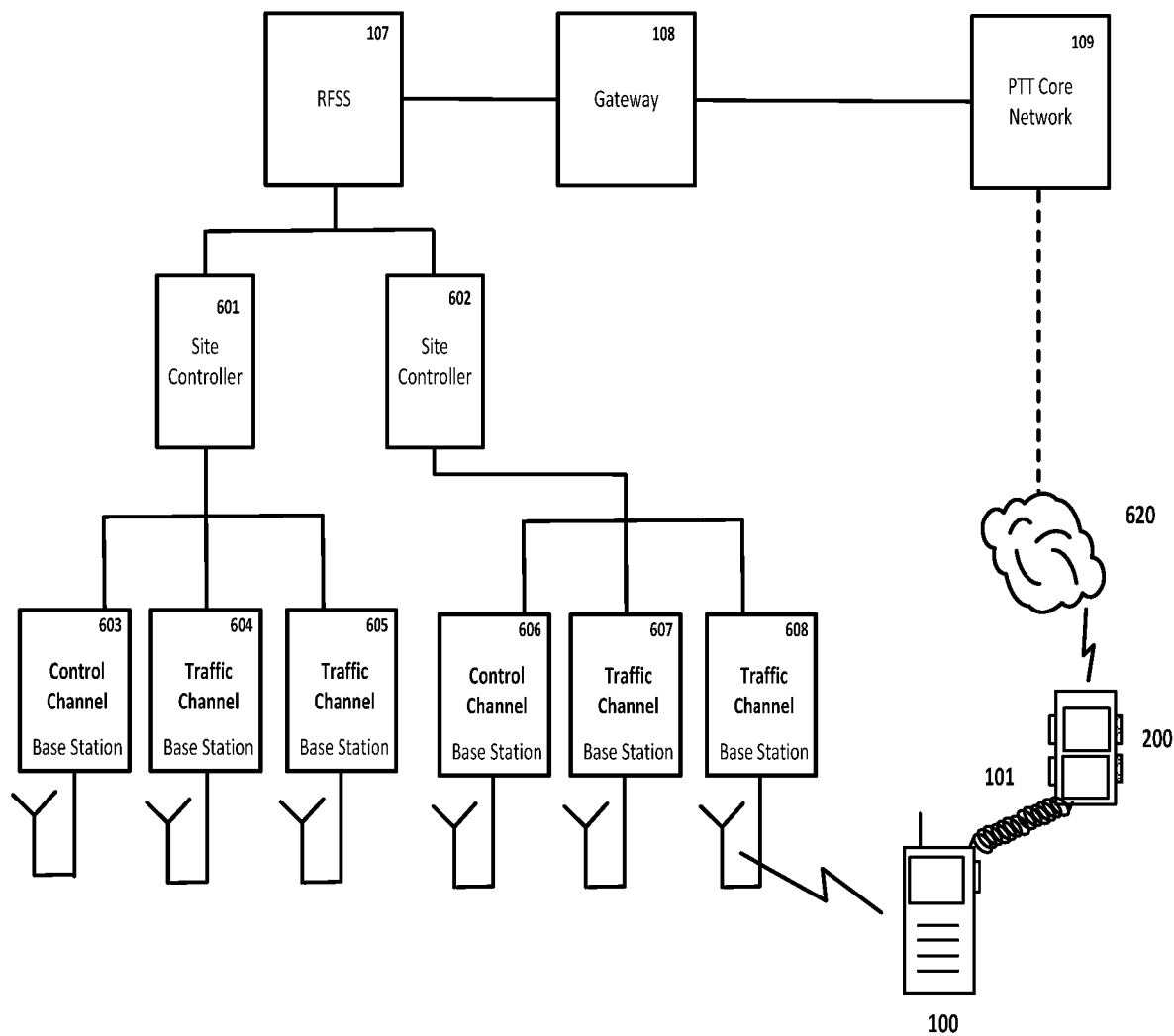
FIG. 7 shows a typical LMR system integrated with a PTT solution.

FIG. 7 describes an architecture according to an embodiment of the invention. Components 107 and 601 to 608 form a physical P25 network made up of a P25 RFSS Controller 107 and two site controllers 601 and 602 and several base stations 603 to 608 making up two control channels and four traffic channels. The RFSS 107 is connected to a voice gateway 108 for a communication servers such as PTT Core network 109 which offers VOIP services. A server of kind is implemented using one or more computer processors and memories and may itself consist of several component servers. The PTT Core Network 109 communicates with smart devices via an IP network which in this case is a cellular network 620. Also shown in this figure is the smart mic 200 connected via a cable 101 to an LMR terminal which can operate on the LMR network controlled by the RFSS 107.

Figure 8:
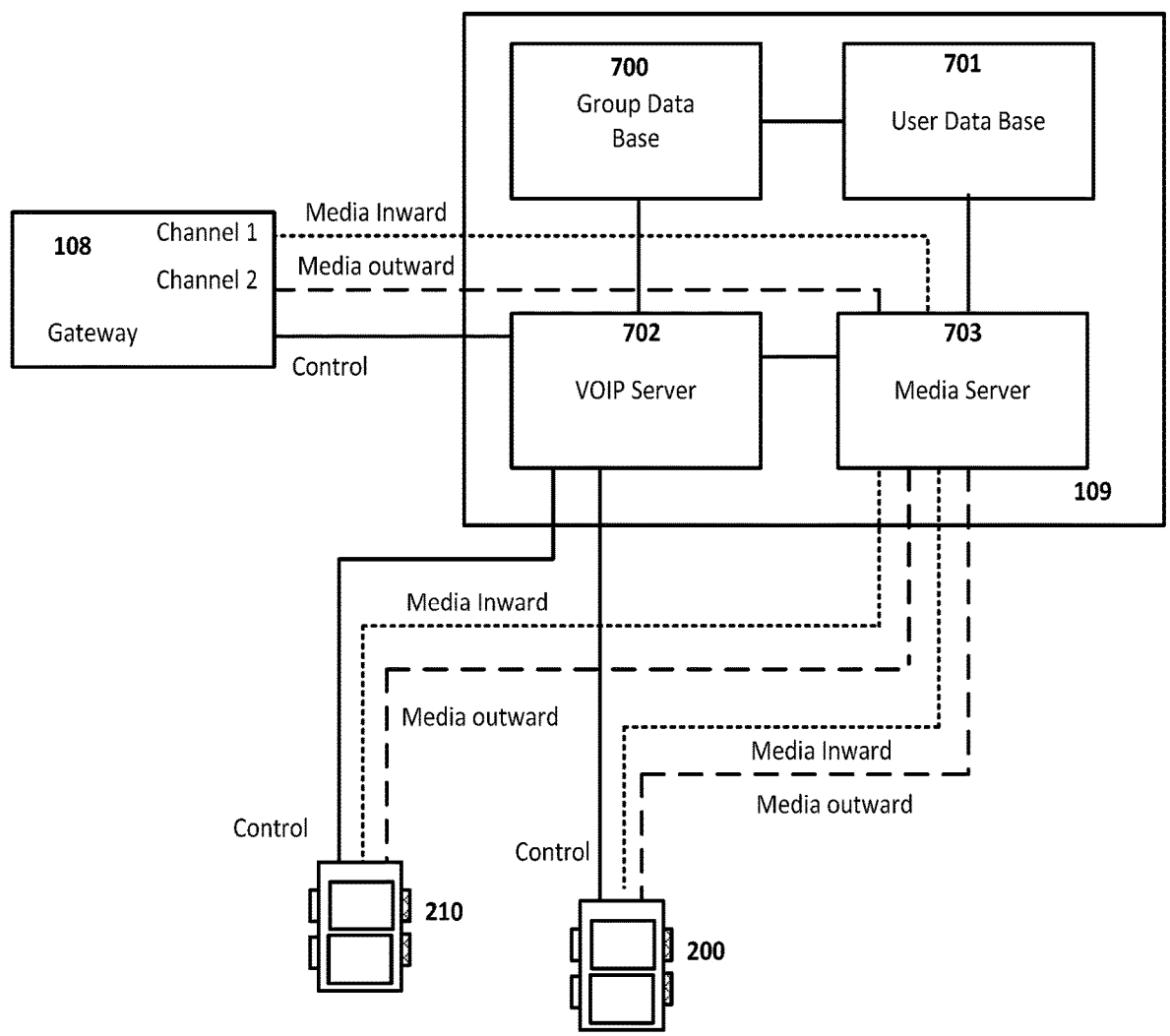
FIG. 8 shows a block diagram of a PTT core network.

FIG. 8 describes the architecture of a PTT core network 109 that is capable of voice services. A user data base 701 contains a list of users authorized to be on the system. Each user will be associated with at least one smart mic 200. Separately a database 700 is configured with a set of groups. For example suppose there are 10 smart mic devices 1 to 10 and each user has one device. Group A may be setup of devices 1, 3, 5, 6 and 10. Group B may be setup as 2, 4, 5, 6 and 9. In these examples devices 5 and 6 are in group A and B whereas all the other groups are in either group A or group B.

A VOIP server 702 is shown which is responsible for receiving call setup requests and establishing those calls according to the group configurations A and B. A SIP (Session Initiation Protocol) server is typically used in the industry for managing call setup. A Media server 703 is also shown which includes an audio mixer responsible for mixing audio from the multiple audio sources. For example in a full duplex call of two devices 200 and 210 audio is coming from both sources and will be mixed together before being sent out to all receivers.

In FIG. 8 two smart devices are shown 200 and 210 and to each device there is Media Inward (i.e. going to the server) and Media Outward (i.e. leaving the server and going to the edge devices). A special case is also shown where the Media Inward may come from a gateway 108 from a port identified as channel 1. Alternatively the Media Outward goes to the gateway 108 on a port identified as channel 2. Control signaling lines are also shown between the smart mic 200 and 210 as well as the gateway 108. These carry normal VOIP signaling as is well known in the art hence will not be described in more detail. In FIG. 8 only one instance of the gateway 108 is shown. However the system described here can support one or many instances of the gateway 108 from one or many RFSS controllers. The gateway 108 may be implemented as individual physical instances or one instance of a gateway containing many instances of 108.

Figure 9:
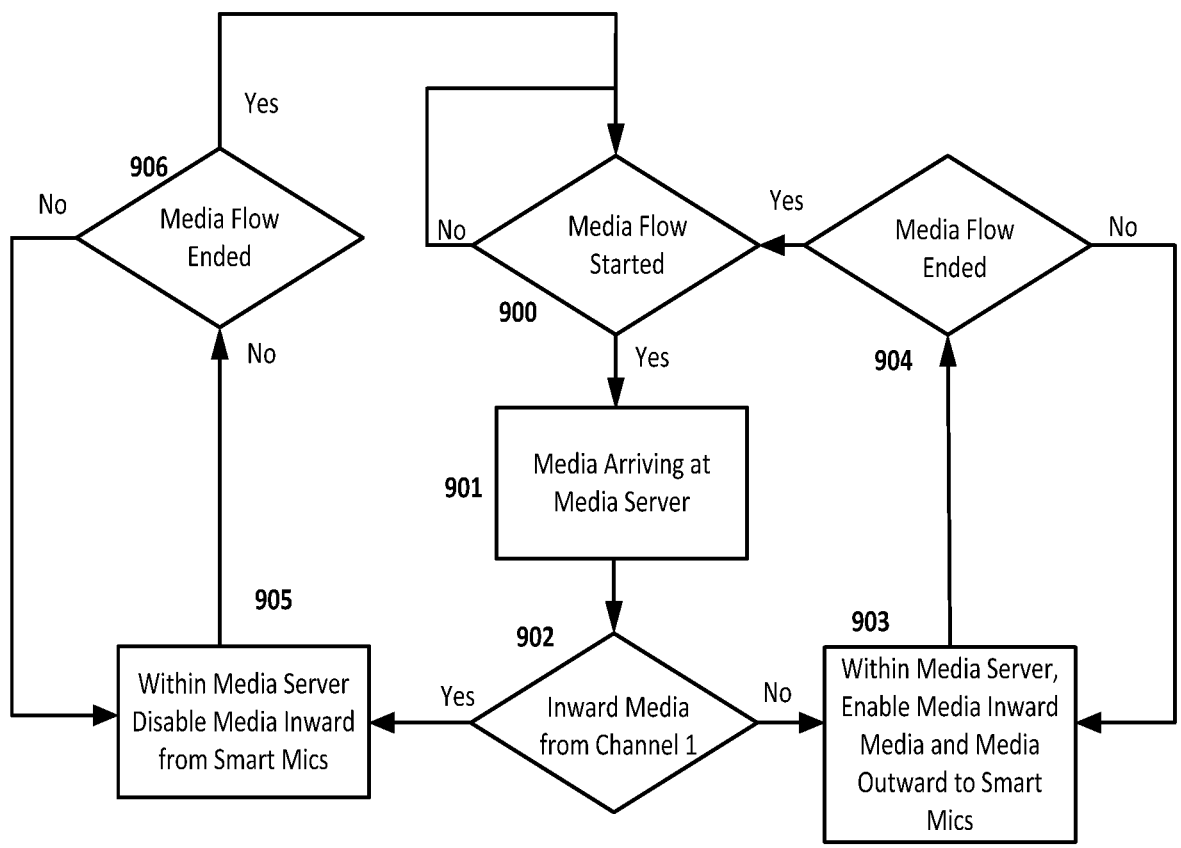
FIG. 9 shows a flow diagram illustrating how to mix full duplex and half duplex.

FIG. 9 illustrates an algorithm that operates within the media server 703. An assessment is made in step 900 as to whether or not media flow has started which means a user has initiated a voice communication commonly referred to as an 'over'. The start of the media flow can be detected automatically by the media server 703 based on audio levels, or the media server can be notified by the source of the media (e.g. device 200). If media has not started then the system remains in the step 900. If however media has started then media starts arriving at the media server as shown in step 901. A check is made in step 902 to establish where the media has come from. If the Media Inward has come from channel 1 on the gateway 108 then in step 905 only the Media Inward is disabled or blocked for the smart mics 200 and 210. During step 905 the user may also receive an indication they are now in half duplex. This indication may be audio (such as an initial beep), visual (such as a LED indication) or physical (such as a device vibration). This has the effect of making the behavior of the smart mic 200 and 210 half duplex. This behavior continues while the audio is being received from the gateway 108. In step 906 a check is made to establish if the media (or over) is finished. This is detected using control signaling within the VOIP server and signaled to the Media Server. The media server can automatically detect that the media has finished based on audio levels, or the media server can be notified by the source of the media. If the media has not stopped then the behavior described in step 905 remains. If the media is finished however the system returns to step 900 to wait for the start of more media.

Returning to step 902, if the Media Inwards has been sourced from a smart mic or other cellular source, rather than channel 1 on the gateway 108 then in step 903 Media Inward and Media Outward are both enabled or allowed for the smart mic which yields full duplex operation. In step 904 a check is made to see if the media flow has ended. If flow has not ended then the system remains in step 903 otherwise it returns to step 900 to wait for another media flow to start.

The method of enabling and disabling the Media flows can be undertaken in the Media Server itself or alternatively can be controlled at the smart mic 200 and 210. See FIGS. 12 and 13. Either approach can be used.

Figure 10:
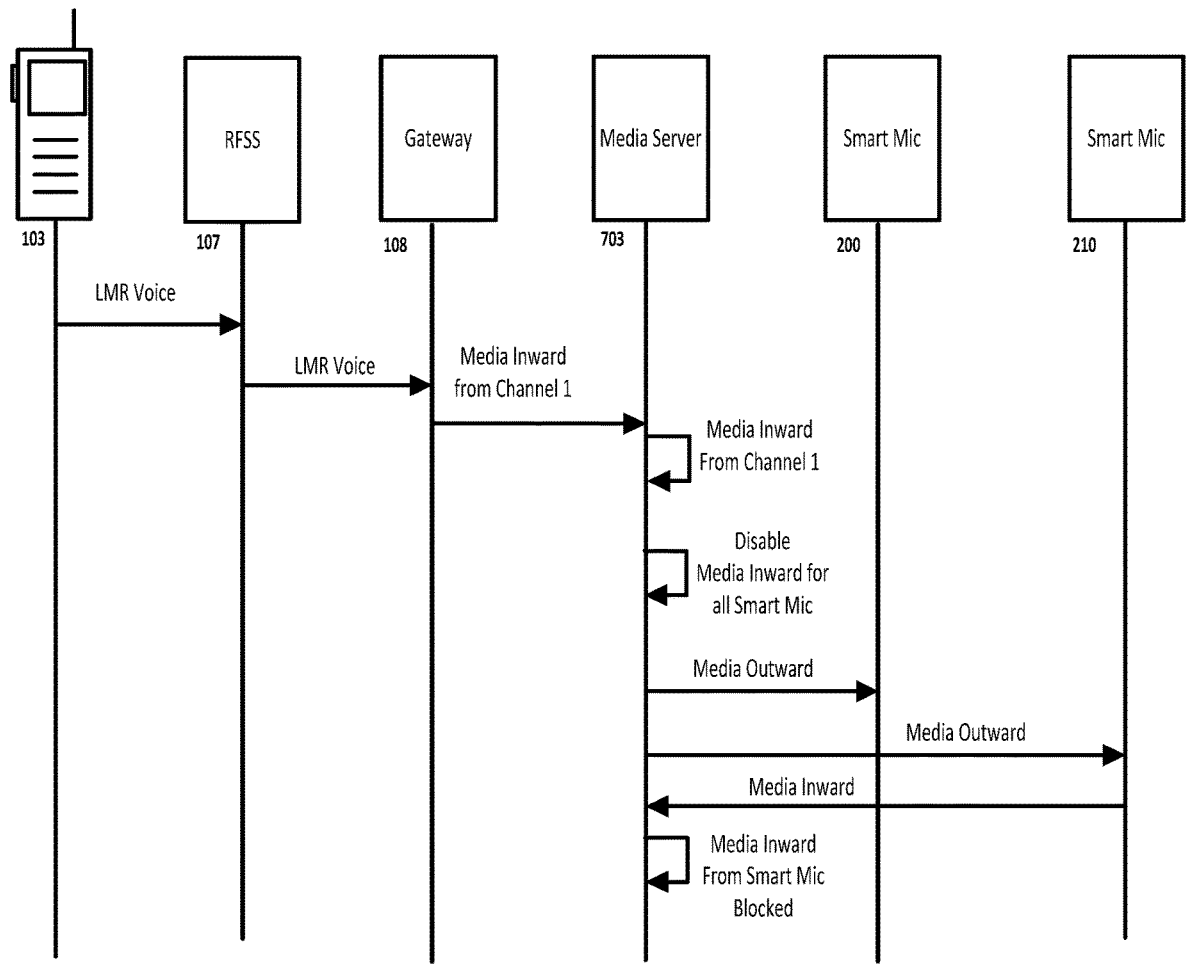
FIG. 10 shows a sequence diagram showing how to manage half duplex voice coming from an LMR system.

FIG. 10 illustrates a sequence diagram in which an LMR terminal 103 initiates a half duplex voice communication that is received at the RFSS. This half duplex communication is passed to the gateway 108 where the LMR voice is transformed into a Media Inward flow on channel 1. Upon arriving at the media gateway 703 a check is made to establish the Media Inwards has originated from channel 1 on the gateway 108. Given this, the Media Inward paths are disabled for all smart mic which transforms the communication into half duplex. The Media Inward is repeated by the media server and sent out to the smart mic 200 and 210 as Media Outward. In this illustration the smart mic 210 is also shown initiating Media Inward which arrives at the media server 703. However since Media Inward is disabled for smart mic then this media flow is blocked. It should be noted the Media Inward could also have been blocked through an implementation at the smart mic 210. See FIGS. 12 and 13.

Figure 11:
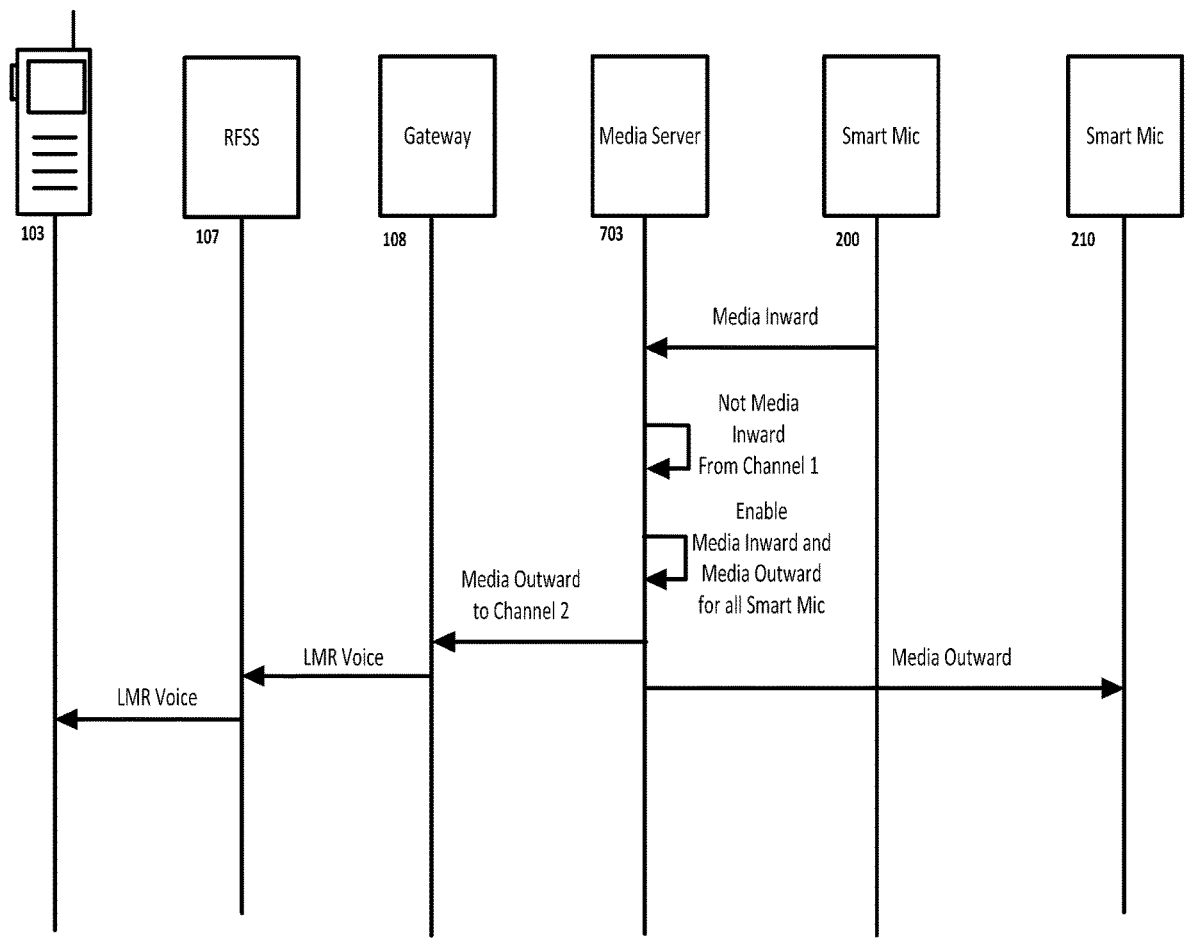
FIG. 11 shows a sequence diagram showing how to manage full duplex voice coming from a smart mic.

FIG. 11 illustrates a sequence diagram in which Media Inward originates at the smart mic 200. The media server 703 detects this flow is not originating from channel 1 on the gateway 708 and as a result both Media Inward and Media Outward are enabled. This has the effect of turning the communication into full duplex. The Media Inward is repeated to the other smart mic 210 as well as to the gateway 108 which transforms the Media Outwards into LMR Voice, passes the LMR voice through to the RFSS 107 which repeats the LMR Voice to LMR radio 103.

Figure 12:
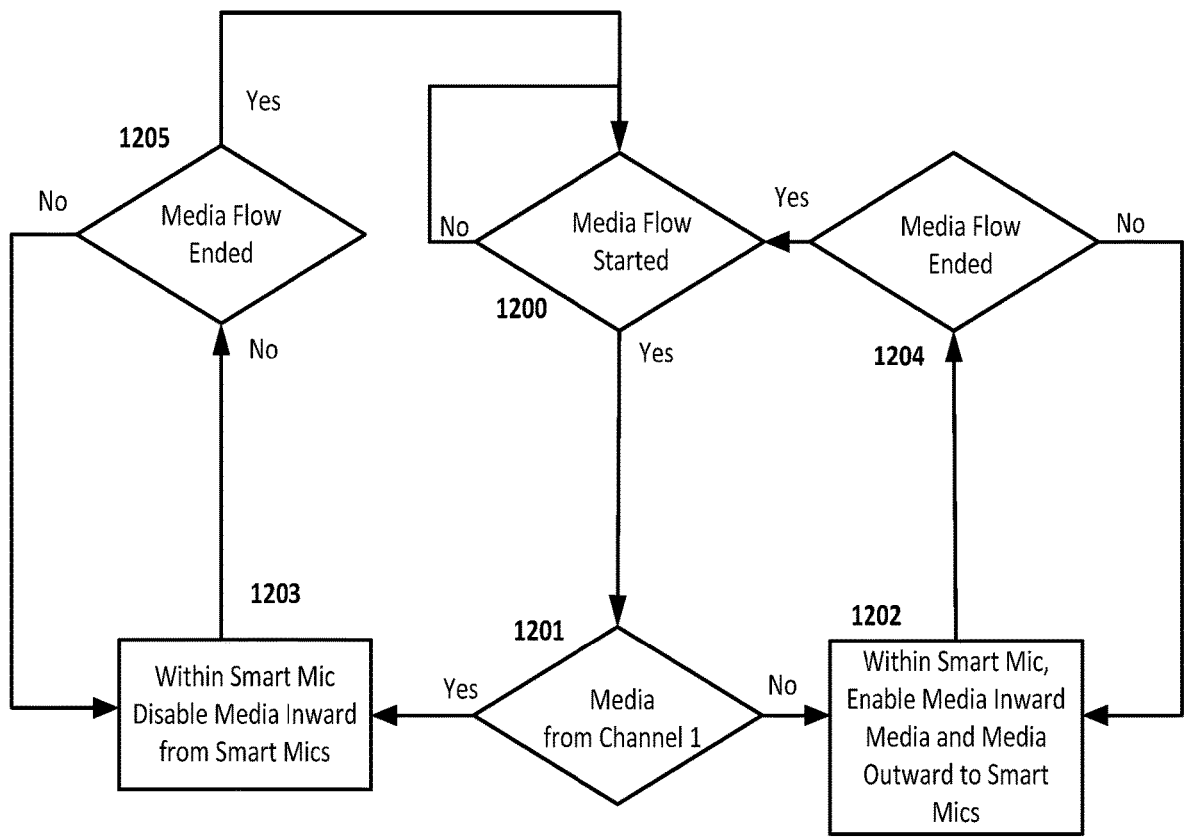
FIG. 12 shows a flow diagram in which the control of media flow is executed in the smart mic.

FIG. 12 illustrates an algorithm operating within a smart mic (for example device 200) that forms an alternative to the algorithm of FIG. 9. An assessment is made in step 1200 as to whether or not media flow has started which means a user has initiated a voice communication commonly referred to as an 'over'. If Media Outward (arriving at smart mic) has not started then the system remains in the step 1200. If however media has started then a check is made in step 1201 to establish where the media has come from. The start of the media can be automatically detected by the smart mic based on incoming audio, or the smart mic can be notified directly by the source of the media. If the Media has come from channel 1 on the gateway 108 then in step 1203 Media Inward from the smart mic (for example 200) is disabled. During step 1203 the user may also receive an indication they are now in half duplex. This indication may be audio (such as an initial beep), visual (such as a LED indication) or physical (such as a device vibration). This has the effect of making the behavior of the smart mic (for example 200) half duplex. This behavior continues while the audio is being received from the gateway 108. In step 1205 a check is made to establish if the media (or over) is finished. This is detected using control signaling within the VOIP server and signaled to the Media Server. The smart mic can automatically detect the end of the media based on lack of incoming audio, or the smart mic can be notified directly by the source of the media If the media has not stopped then the behavior described in step 1205 remains. If the media is finished however the system returns to step 1200 to wait for the start of more media.

Returning to step 1201, if the Media Outwards (arriving at smart mic) has not been sourced from channel 1 on the gateway 108 then in step 1202 Media Inward and Media Outward are both enabled for the smart mic which yields full duplex operation. In step 1204 a check is made to see if the media flow has ended. If flow has not ended then the system remains in step 1202 otherwise returns to step 1200 to wait for another media flow to start.

Figure 13:
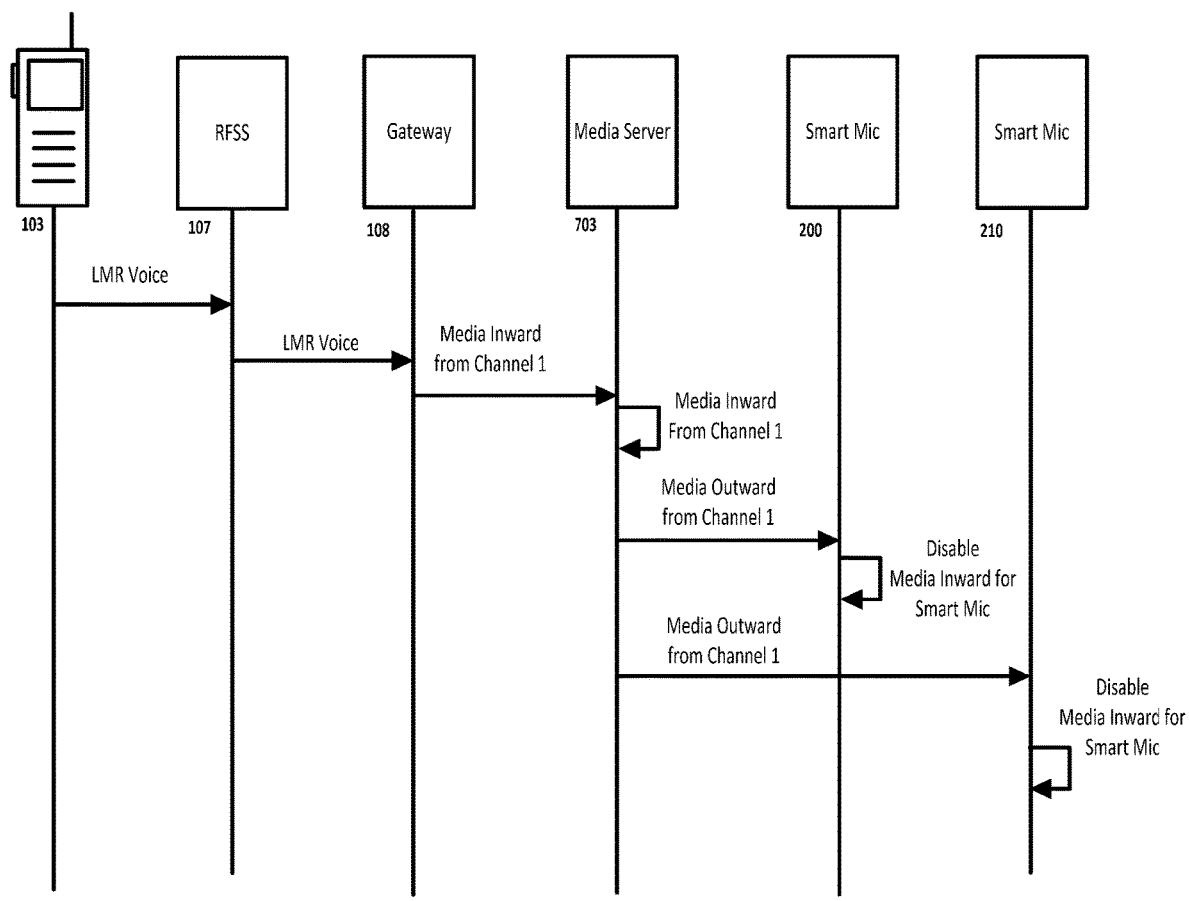
FIG. 13 shows a sequence diagram in which the control of media flow is executed in the smart mic.

FIG. 13 illustrates a sequence diagram in which an LMR terminal 103 initiates a half duplex voice communication that is received at the RFSS. This half duplex communication is passed to the gateway 108 where the LMR voice is transformed into a Media Inward flow on channel 1. Upon arriving at the media gateway 703, the LMR voice is transformed into Media Outward (out of the media server) and sent to all smart mic that are part of the present voice group. Upon arriving at the smart mic 200 a check is made to establish the Media Outwards has originated from channel 1 on the gateway 108. Given this, the Media Inward paths are disabled for smart mic 200 which means smart mic 200 is now operating in half duplex.

Upon arriving at the smart mic 210 a check is made to establish the Media Outwards has originated from channel 1 on the gateway 108. Given this, the Media Inward paths are disabled for smart mic 210 which means smart mic 210 is now operating in half duplex.

Figure 14:
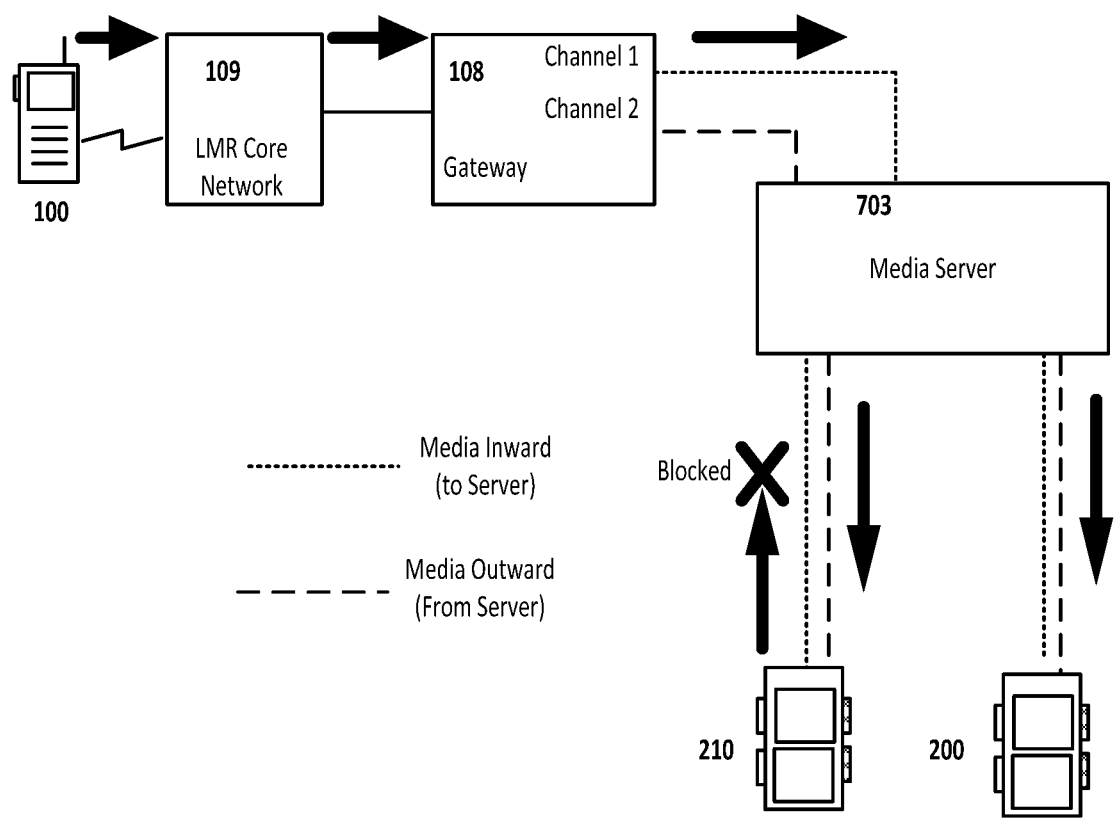
FIG. 14 shows an example of a signal flow through the system.

FIG. 14 shows a signal flow through the system as an example. An LMR terminal 100 initiates an audio flow into the LMR core network 109. This audio flow is passed onto the gateway 108 which is included as a group member for the call. The gateway transforms the LMR signal into a VOIP signal and transmits the VOIP data on channel 1 (Inward Media) to the media server. The media server retransmits the media as Outward Media to all smart mic that are in the present voice group. If the Inward Media has come from channel 1 on the gateway 108 then Inward Media from the smart mic is disabled. As described in FIGS. 9 to 13 the Inward Media can be blocked either within the Media Server itself or the Media can be blocked at the smart mics.

The invention claimed is:

1. A method of communication between half duplex and full duplex systems, comprising:
   providing a media server which communicates audio signals between a plurality of half duplex and full duplex sources,
   detecting that a media stream is from a gateway that is only capable of sending a stream that originates from a half duplex source, avoiding a requirement for a call setup protocol,
   blocking media streams that do not originate from the gateway source to create half duplex communication,
   sending from the media server only the media stream that is received from the gateway in the half duplex communication,
   detecting that the media stream from the gateway has ended,
   detecting that a further media stream is not from a gateway that is only capable of sending a stream that originates from a half duplex source,
   allowing media streams that originate from multiple full duplex sources,
   mixing the media streams from said multiple full duplex sources, and
   sending the mixed streams to said multiple full duplex sources and to the gateway to create full duplex communication.

2. The method according to claim 1, wherein a decision to block a media stream that is not from the gateway is made based on the start of the stream that is not from the gateway.

3. The method according to claim 1, wherein a decision to allow multiple media is made based on the start of media from a source other than the gateway.

4. The method according to claim 1, wherein the media stream from the gateway originates from a terminal in a land mobile radio (LMR) communication system.

5. The method according to claim 1, wherein the media stream that is not from the gateway originates from a terminal in a cellular communication system.

6. The method of communication according to claim 1, wherein detecting the media stream from the gateway includes detecting that the media stream is received on a predetermined channel, so that the stream from the gateway is only capable of originating from a half duplex source.

7. A communication server which enables communication between half duplex and full duplex systems, having a processor and memory, the memory containing program instructions which cause the processor to:
   detect that a media stream is from a gateway having a source that is only capable of operating in half duplex, wherein the gateway communicates with the communication server on a channel that does not require a call set up protocol,
   block media streams that do not originate from the gateway source to create half duplex communication,
   transmit only the media stream from the gateway in the half duplex communication,
   detect that the media stream from the gateway has ended,
   detect that the source of a further media stream is not from the gateway having the source that is only capable of operating in half duplex,
   allow media streams from multiple full duplex sources that are not from the gateway having the source that is only capable of operating in half duplex,
   mix the allowed media streams from said multiple full duplex sources to form a combined media stream, and
   transmit the combined media stream to said multiple full duplex sources and the gateway to create full duplex communication.

8. The communication server according to claim 7, wherein a decision to block a media stream that is not from the gateway is made based on the start of the stream from the gateway.

9. The communication server according to claim 7, wherein a decision to allow multiple media is made based on the start of media from a source other than the gateway.

10. The communication server according to claim 7, wherein the media stream from the gateway originates from a terminal in a land mobile radio (LMR) communication system.

11. The communication server according to claim 7, wherein the media stream that is not from the gateway originates from a terminal in a cellular communication system.

12. The communication server according to claim 7, wherein the gateway communicates with the communication server using a predetermined channel, so that the stream from the gateway is only capable of originating from a half duplex source.

* * * * *